July 12, 1966 R. GRUMBEIN 3,260,465
GAS TORCH
Filed Nov. 17, 1964
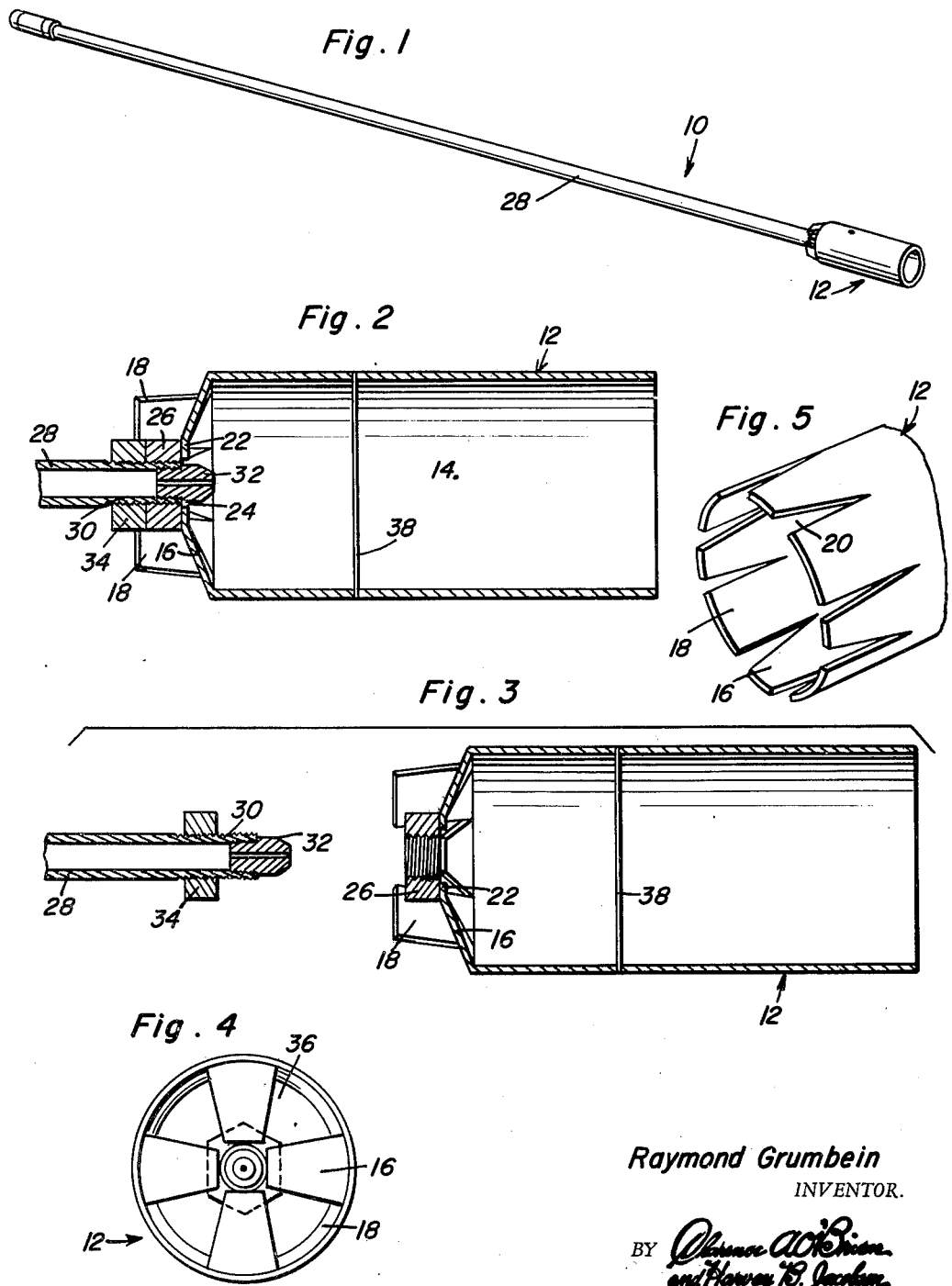
Raymond Grumbein
INVENTOR.

3,260,465
GAS TORCH
Raymond Grumbein, McCracken, Kans.
Filed Nov. 17, 1964, Ser. No. 411,784
9 Claims. (Cl. 239—430)

The present invention relates to new and useful improvements in gas torches or burners. It is a primary object of the instant invention to provide a gas torch which, because of the unique construction thereof, provides a degree of efficiency not normally associated with portable units.

Another significant object of the instant invention is to provide, in a gas torch, a unique mixing chamber construction including enlarged shielded air intake openings at the inlet end thereof.

Also, it is an object of the instant invention to ensure a proper mixing of the gas and air within the chamber by the provision of a turbulence creating wire diametrically thereacross forward of the air openings and the gas introducing nozzle.

Likewise, it is a significant object of the instant invention to provide for a unique means of mounting the mixing chamber relative to the nozzle and gas supplying line.

In conjunction with the above objects, it is also an object of the instant invention to provide a gas torch which, while highly efficient, is of relatively simple construction capable of accommodating a wide range of gas pressure and also capable of operating under adverse weather conditions.

Basically, in order to achieve the above objects, it is contemplated that the torch of the instant invention consist of an elongated cylindrical mixing chamber defined by an elongated open-ended tubular member. This tubular member includes a plurality of circumferentially spaced slits or slots extending inwardly from one end thereof so as to define a plurality of tabs. Alternate ones of the tabs are folded inwardly and substantially laterally so as to define, with their inner ends, a passage for the nozzle. The inner ends of the inwardly folded tabs are rigidly interconnected by an internally threaded nut welded thereto, this nut having the adjoining end of the gas supply line or pipe threaded therein with the nozzle itself being threaded within the same end of the supply line. In this manner, it will be appreciated that the projection of the nozzle into the mixing chamber can be varied, with the final position of the nozzle being fixed by a locknut. The alternate unfolded tabs are inclined slightly inward so as to provide shielded air holes for the introduction of air into the mixing chamber. In addition, it is contemplated that, where deemed necessary, a turbulence creating wire be positioned laterally across the mixing chamber forward of the nozzle and air holes or openings so as to ensure a complete mixing of the air and gas which, incidentally, is to generally be liquid petroleum gas.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the gas torch including the elongated handle-forming supply line or pipe;

FIGURE 2 is an enlarged cross-sectional view through the gas torch;

FIGURE 3 is an enlarged cross-sectional view similar to FIGURE 2 with the nozzle mounting supply line exploded from the mixing chamber;

FIGURE 4 is an end elevational view of the mixing chamber; and

FIGURE 5 is a partial perspective view of the slotted end of the chamber-forming tubular member prior to an inward folding of the alternate tabs.

Referring now more specifically to the drawings, reference numeral 10 is used to generally designate the gas torch or gas burner of the instant invention. The burner 10 includes an elongated tubular open-ended member 12 forming an elongated mixing chamber 14. Referring to FIGURE 3, it will be noted that one end of the tubular member 12 includes a plurality of integral inwardly folded tabs 16 alternating with tabs 18 inclined slightly inwardly so as to in effect shield the openings between the tabs 16 alternating therewith. The tabs 16 and 18 are formed, referring to FIGURE 5, by providing a series of slots 20 extending longitudinally inward from the end of the tubular member 12 and subsequently folding the tabs 16, which incidentally can have slightly converging side edges, inwardly substantially laterally to the cylindrical portion of the member 12, and inclining the tabs 18 slightly inwardly.

With reference to FIGURES 2 and 3, it will be noted that the inwardly folded tabs 16 define a slightly conical portion with the ends 22 thereof being coplanar and spaced from each other so as to form a passage 24 coaxial with the tubular member 12. A connector in the form of an internally threaded nut 26 is welded to these inner ends 22 so as to mount the mixing chamber 14 on the elongated handle-forming gas supply pipe or line 28.

The gas supply line 28 is in the form of a hollow rigid pipe and has the forward end 30 thereof both internally and externally threaded. A gas dispensing nozzle 32 is threadedly received within the internally threaded end 30 while the external threads on the end 30 are engaged within the internally threaded nut 26 welded to the inner ends 22 of the inwardly folded tabs 16. It is contemplated that the end 30 be externally threaded for a distance so as to allow for an adjustment of the burner 10 by regulating the length of projection of the nozzle 32 into the mixing chamber 14. When the final adjustment of the nozzle 32 is achieved, the locknut 34, threaded on the end 30, is brought into locking engagement with the mounting nut 26 so as to fix the position of the nozzle 32.

It will of course be appreciated that the openings 36 between the spaced inwardly folded tabs 16 constitute the means whereby air is introduced into the mixing chamber 14, these openings 36 being shielded by the slightly inclined tabs 18 which provide for a constant air flow while at the same time providing a substantial degree of protection which enables the use of the torch even under extremely windy conditions. Incidentally, as will be appreciated from the drawings, four tabs 16 and four tabs 18 are formed.

In order to ensure a proper mixing of the gas and air, especially when the gas is under very high pressure, an elongated wire 38 is positioned diametrically across the mixing chamber 14 slightly forward of the nozzle 32 so as to effect a turbulence of the introduced gas and air. This wire 38 is to have the opposite ends thereof received within holes in the opposite sides of the tubular member 12 and be welded therein. The gas will of course be introduced from any suitable pressurized source through the supply pipe handle 28.

Utilizing the above specifically described construction, it has been found that with a tubular member 12 having an outside diameter of 1⅞" and a length of 4½", the torch will burn on L.P. gas without a pressure regulator and produce a blue flame on a gas pressure of 10 to 175 p.s.i. In addition, it has been found that such a torch will continually burn in winds up to and greater than 60 miles per hour, thus making the device highly desirable for outdoor use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A gas torch including an elongated cylindrical mixing chamber, said chamber being defined by an elongated tubular member having the opposite ends thereof open, a plurality of slots extending longitudinally inward from one end of said member, said slots being spaced peripherally about the member and defining a plurality of integral tabs, selected ones of said tabs being folded generally laterally inward toward each other, the inner ends of the inwardly folded tabs being generally coplanar and spaced from each other so as to define a passage, and a gas nozzle projecting through said passage and being fixed to the inner ends of the inwardly folded tabs.

2. The device of claim 1 including connector means rigidly interconnecting the inner ends of the inwardly folded tabs, said connector means releasably mounting said nozzle within the passage.

3. The device of claim 2 wherein said connector means consists of a member bonded to said inner ends and having an internally threaded aperture therethrough aligned with said passage.

4. The device of claim 3 including an elongated gas supply line, one end of said line being both internally and externally threaded, said nozzle being threaded within said one end of said line, said one end of said line being threaded within the internally threaded aperture of the connector means so as to position the nozzle in the passage.

5. The device of claim 4 including a turbulence creating means fixed in the mixing chamber forward of the nozzle.

6. The device of claim 5 wherein said turbulence creating means consists of an elongated wire extending diametrically across the chamber and being fixed to the opposite sides thereof.

7. The device of claim 6 wherein eight tabs are formed, said inwardly folded tabs consisting of every other tab.

8. The device of claim 7 wherein those tabs alternating with the inwardly folded tabs are inclined slightly inwardly so as to form shielded air openings.

9. The device of claim 1 including a turbulence creating wire fixed diametrically across the chamber forward of the nozzle.

References Cited by the Examiner

UNITED STATES PATENTS

| | | | |
|---|---|---|---|
| 724,957 | 4/1903 | Shaeffer | 158—118 |
| 959,593 | 5/1910 | Lackett. | |
| 1,062,640 | 5/1913 | Eimer | 239—432 |
| 2,512,541 | 6/1950 | Garretson | 158—118 |
| 2,839,131 | 6/1958 | Pattinson | 158—118 |

FOREIGN PATENTS 191,532  1/1923  Great Britain.

M HENSON WOOD, JR., *Primary Examiner.*

R. S. STROBEL, *Assistant Examiner.*